(12) United States Patent
Bai et al.

(10) Patent No.: US 12,245,161 B2
(45) Date of Patent: Mar. 4, 2025

(54) PATH LOSS REFERENCE SIGNAL (PLRS) UPDATING USING AN APPLICATION TIME INTERVAL

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 17/457,351

(22) Filed: Dec. 2, 2021

(65) Prior Publication Data
US 2022/0225241 A1    Jul. 14, 2022

Related U.S. Application Data

(60) Provisional application No. 63/137,711, filed on Jan. 14, 2021.

(51) Int. Cl.
  *H04W 52/24* (2009.01)
  *H04L 5/00* (2006.01)
  *H04W 52/14* (2009.01)

(52) U.S. Cl.
  CPC ......... *H04W 52/242* (2013.01); *H04L 5/0048* (2013.01); *H04L 5/0055* (2013.01); *H04W 52/146* (2013.01)

(58) Field of Classification Search
  CPC ......... H04W 52/00–60; H04W 52/146; H04W 52/242; H04L 5/0048; H04L 5/0055
  See application file for complete search history.

(56) References Cited

U.S. PATENT DOCUMENTS

2016/0338088 A1* 11/2016 Fakoorian ............ H04L 5/0053
2019/0052337 A1*  2/2019 Kwon ................. H04W 72/542
(Continued)

FOREIGN PATENT DOCUMENTS

WO    WO-2021119663 A1    6/2021
WO    WO-2021154372 A1    8/2021

OTHER PUBLICATIONS

Apple Inc: "Remaining Issues on Multi-Beam Operation", 3GPP Draft, R1-1912824, 3GPP TSG-RAN WG1 #99, 3rd Generation Partnership Project (3GPP), Mobile Competence Centre, 650 Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823624, 14 Pages, Retrieved from the Internet: URL: https://ftp.3gpp.org/tsg_ran/WG1_RL1/TSGR1_99/Docs/R1-1912824.zip.
(Continued)

*Primary Examiner* — Raymond S Dean
(74) *Attorney, Agent, or Firm* — Norton Rose Fulbright US LLP

(57) ABSTRACT

This disclosure provides systems, methods and apparatus, including computer programs encoded on computer storage media, for wireless communication. In one aspect, a base station (BS) transmits a message to a UE indicating a designation of a signal as a PLRS. The designation of the signal as the PLRS is associated with an application time interval, and after expiration of the application time interval, the BS receives an uplink signal from the UE having a transmit power level associated with the signal.

28 Claims, 7 Drawing Sheets

(56) References Cited

U.S. PATENT DOCUMENTS

| | | | | |
|---|---|---|---|---|
| 2019/0215117 A1* | 7/2019 | Lee | ....................... | H04L 5/0094 |
| 2021/0185617 A1* | 6/2021 | Zhou | ................... | H04W 52/146 |
| 2022/0322246 A1* | 10/2022 | Cirik | ................... | H04W 52/365 |
| 2022/0346028 A1* | 10/2022 | Cirik | ..................... | H04W 52/54 |

OTHER PUBLICATIONS

International Search Report and Written Opinion—PCT/US2021/072733—ISA/EPO—Mar. 29, 2022.
QUALCOMM: "Applicable Timing for Pathloss RS Activated/Updated by MAC-CE," 3GPP Draft, 3GPP TSG-RAN WG4 RAN4#93, R4-1914980, 3rd Generation Partnership Project (3GPP), Mobile Competence Centre, 650, Route Des Lucioles, F-06921, Sophia-Antipolis Cedex, France, vol. RAN WG4. No. Reno, Nevada, Nov. 18, 2019-Nov. 22, 2019, Nov. 8, 2019 (Nov. 8, 2019), XP051819259, pp. 1-4, Retrieved from the Internet: URL: https://ftp.3gpp.org/tsg_ran/WG4_Radio/TSGR4_93/Docs/R4-1914980.zip Radio R4-1914980. docx [retrieved on Nov. 8, 2019].

\* cited by examiner

PATH LOSS REFERENCE SIGNAL (PLRS) UPDATING USING AN APPLICATION TIME INTERVAL

CROSS-REFERENCE TO RELATED APPLICATIONS

This application claims the benefit of U.S. Provisional Patent Application No. 63/137,711, entitled, "PATH LOSS REFERENCE SIGNAL (PLRS) UPDATING USING AN APPLICATION TIME INTERVAL," filed on Jan. 14, 2021, which is expressly incorporated by reference herein in its entirety.

TECHNICAL FIELD

Aspects of the present disclosure relate generally to wireless communication systems, and more particularly, but without limitation, to wireless communication systems that use path loss reference signals.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the third ($3^{rd}$) Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The systems, methods and devices of this disclosure each have several innovative aspects, no single one of which is solely responsible for the desirable attributes disclosed herein. One innovative aspect of the subject matter described in this disclosure can be implemented in a method of wireless communication at a user equipment (UE). The method includes receiving a message indicating a designation of a signal as a path loss reference signal (PLRS). The designation of the signal as the PLRS is associated with an application time interval. The method further includes, after expiration of the application time interval, selecting a transmit power level associated with the UE, where the transmit power level is associated with the signal.

Another innovative aspect of the subject matter described in this disclosure can be implemented in a method for wireless communication at a user equipment (UE). The method includes receiving a message indicating a modification of one or more parameters associated with an uplink power setting of the UE. The modification of the one or more parameters is to take effect upon expiration of an application time interval. The method further includes, after the expiration of the application time interval, applying the modified one or more parameters. The method further includes selecting the uplink power setting based on the modified one or more parameters.

Another innovative aspect of the subject matter described in this disclosure can be implemented in an apparatus configured for wireless communication. The apparatus includes a memory and one or more processors coupled to the memory. The one or more processors are configured to receive a message indicating a designation of a signal as a path loss reference signal (PLRS). The designation of the signal as the PLRS is associated with an application time interval. The one or more processors are further configured to select, after expiration of the application time interval, a transmit power level, where the transmit power level is associated with the signal.

Another innovative aspect of the subject matter described in this disclosure can be implemented in a non-transitory computer-readable medium storing instructions executable by a processor to perform operations. The operations include receiving a message indicating a designation of a signal as a path loss reference signal (PLRS). The designation of the signal as the PLRS is associated with an application time interval. The operations further include, after expiration of the application time interval, selecting a transmit power level. The transmit power level is associated with the signal.

Another innovative aspect of the subject matter described in this disclosure can be implemented in an apparatus. The apparatus includes means for receiving a message indicating a designation of a signal as a path loss reference signal (PLRS). The designation of the signal as the PLRS is associated with an application time interval. The apparatus further includes means for selecting, after expiration of the application time interval, a transmit power level. The transmit power level is associated with the signal.

Another innovative aspect of the subject matter described in this disclosure can be implemented in a method for wireless communication at a base station. The method includes transmitting a message to a user equipment (UE)

indicating a designation of a signal as a path loss reference signal (PLRS). The designation of the signal as the PLRS is associated with an application time interval. The method further includes, after expiration of the application time interval, receiving an uplink signal from the UE having a transmit power level that is associated with the signal.

Another innovative aspect of the subject matter described in this disclosure can be implemented in a method for wireless communication at a base station. The method includes transmitting a message to a user equipment (UE) indicating a modification of one or more parameters associated with an uplink power setting of the UE. The modification of the one or more parameters is to take effect upon expiration of an application time interval. The method further includes, after the expiration of the application time interval, receiving and uplink signal from the UE having the uplink power setting.

Another innovative aspect of the subject matter described in this disclosure can be implemented in an apparatus configured for wireless communication. The apparatus includes a memory and one or more processors coupled to the memory. The one or more processors are configured to Another innovative aspect of the subject matter described in this disclosure can be implemented in Another innovative aspect of the subject matter described in this disclosure can be implemented in a non-transitory computer-readable medium storing instructions executable by a processor to perform operations. The operations include transmitting a message to a user equipment (UE) indicating a designation of a signal as a path loss reference signal (PLRS). The designation of the signal as the PLRS is associated with an application time interval. The method further includes, after expiration of the application time interval, receiving an uplink signal from the UE having a transmit power level that is associated with the signal.

Another innovative aspect of the subject matter described in this disclosure can be implemented in an apparatus. The apparatus includes means for transmitting a message to a user equipment (UE) indicating a designation of a signal as a path loss reference signal (PLRS). The designation of the signal as the PLRS is associated with an application time interval. The apparatus further includes means for receiving, after expiration of the application time interval, an uplink signal from the UE having a transmit power level that is associated with the signal.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
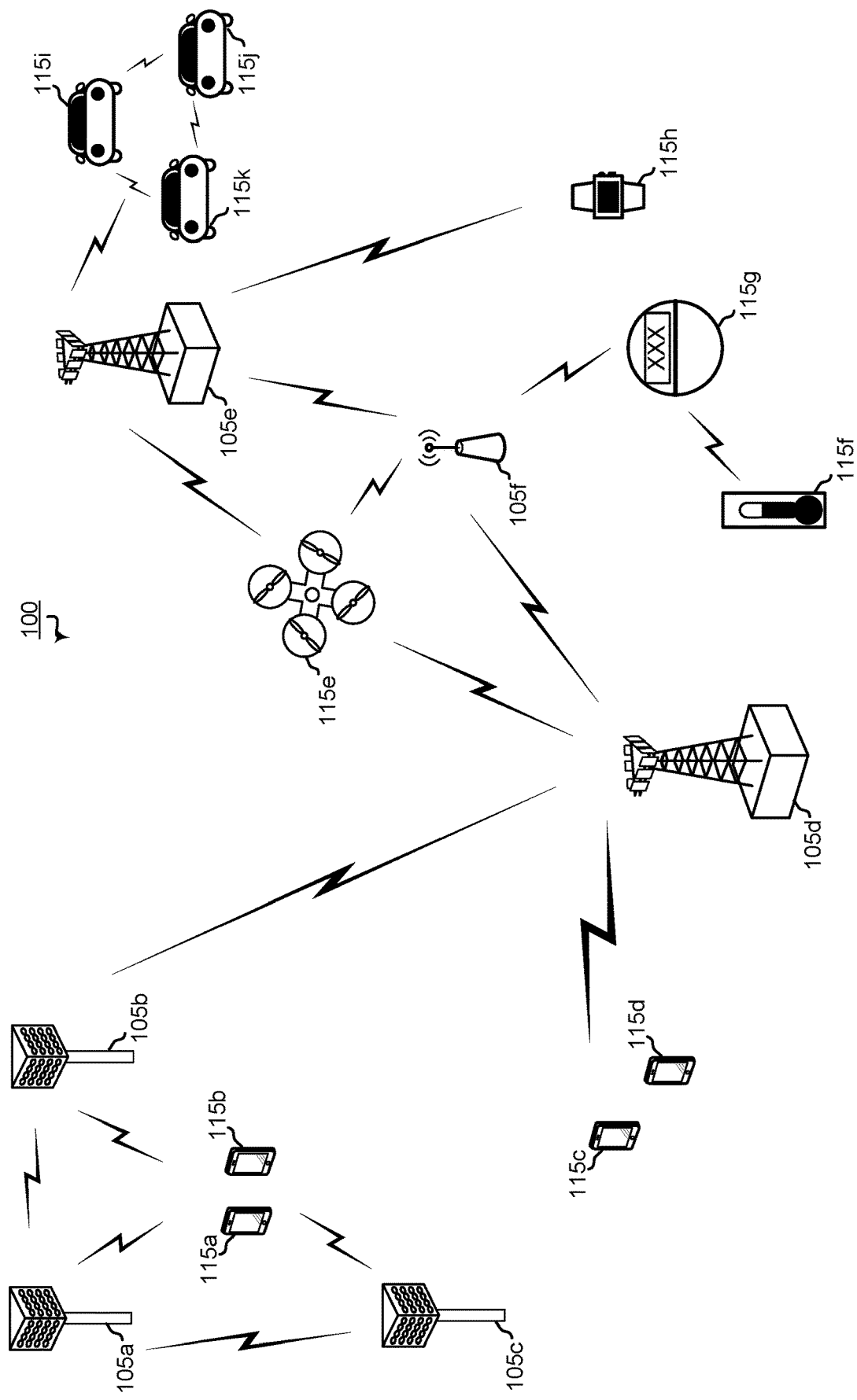
FIG. 1 is a block diagram illustrating details of an example wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

To improve reliability of wireless communications, a device in a wireless communication systems may estimate a path loss characteristic associated with a wireless channel and may select a transmit power level to compensate for the path loss characteristic. For example, if the device detects an increase in the path loss characteristic, the device may increase the transmit power level.

A path loss characteristic may be measured or estimated using a reference signal, which may have one or more reference characteristics that are known to or expected by the device. In some wireless communication protocols, instead of using a dedicated signal for path loss estimation, one or more other signals may be "repurposed" for path loss estimation and designated as a path loss reference signal (PLRS). Further, in some cases, the designated PLRS may be dynamically changed from one signal to another signal, such as in response to a change in beam direction.

In some cases, a change in the designated PLRS may at least temporarily reduce accuracy of selection of the transmit power level. To illustrate, a device may measure the PLRS over multiple measuring occasions, such as in connection with an averaging technique. In response to a change in the designated PLRS, the device may use multiple measuring occasions to measure the designated PLRS, during which time the device may be unable to select (or unable to accurately select) the transmit power level.

In some aspects of the disclosure, a user equipment (UE) may receive a message indicating a designation of a signal as a path loss reference signal (PLRS). The designation of the signal as the PLRS may be associated with an application time interval. During the application time interval, the UE may "warm up" to the PLRS, such as by performing one or more measurements of the PLRS that may be used in connection with an averaging technique. After expiration of the application time interval, the UE may begin to track the signal as the PLRS. For example, the UE may apply a transmit power level that is based on the signal to one or uplink signals transmitted by the UE.

Particular implementations of the subject matter described in this disclosure can be implemented to realize one or more of the following potential advantages. In some aspects, use of the application time interval may enable the UE to "warm up" to a change in reference signal, such as by sampling the reference signal over one or more occasions prior to updating the transmit power level based on the reference signal. As a result, a path loss parameter may be more accurate as compared to certain systems that use an "immediate" change in reference signal to determine a transmit power level. Accordingly, the transmit power level may more closely reflect the path loss between a base station and the UE, which may reduce or avoid instances of lost packets (such as if the transmit power level is set too low to compensate for the path loss) or which may reduce power consumption of the UE (such as if the transmit power level is set higher than appropriate for the particular path loss). Further, the application time interval may be selected (or "customized") according to one or more criteria, as described further herein. As a result, the duration of the application time interval may be increased or decreased according to the particular circumstances.

In some aspects, the message indicating the designation of the PLRS is transmitted using dynamic signaling, such as downlink control information (DCI), which may reduce latency associated with updating the PLRS configuration. For example, a UE may support up to 64 spatial relationships or 64 candidate beams for uplink transmission, and the UE may support up to 4 PLRSs. Therefore, use of DCI signaling to indicate the update of the PLRS may better support dynamic association between the PLRSs with spatial relationships or candidate beams.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UNITS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1 M nodes/km$^2$), ultra-low complexity (such as ~10s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps/km$^2$), extreme data rates (such as multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device to device or peer to peer or ad hoc network arrangements, etc.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

As described herein, a base station (BS) 105 may include one or more components that are located at a single physical location or one or more components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 (also known as a monolithic BS) or a BS 105 including components that are located at various physical locations or virtualized locations (also known as a disaggregated BS). In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (or centralized unit CU), a distributed unit (DU), or a radio unit (RU).

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (such as MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115*a*-115*d* of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115*e*-115*k* illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105*a*-105*c* serve the UEs 115*a* and 115*b* using 3D beamforming and coordinated spatial techniques, such as coordinated multipoint (CoMP) or multi-connectivity. Macro base station 105*d* performs backhaul communications with the base stations 105*a*-105*c*, as well as small cell, the base station 105*f*. Macro base station 105*d* also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115*e*, which is a drone. Redundant communication links with the UE 115*e* include from the macro base stations 105*d* and 105*e*, as well as small cell base station 105*f*. Other machine type devices, such as UE 115*f* (thermometer), the UE 115*g* (smart meter), and the UE 115*h* (wearable device) may communicate through the wireless network 100 either directly with base stations, such as the small cell base station 105*f*, and the macro base station 105*e*, or in multi-hop configurations by communicating with another user device which relays its information to the network, such as the UE 115*f* communicating temperature measurement information to the smart meter, the UE 115*g*, which is reported to the network through the small cell base station 105f. The 5G network 100 may provide additional network efficiency through dynamic, low-latency TDD/FDD communications, such as in a vehicle-to-vehicle (V2V) mesh network between the UEs 115i-115k communicating with the macro base station 105e.

Figure 2:
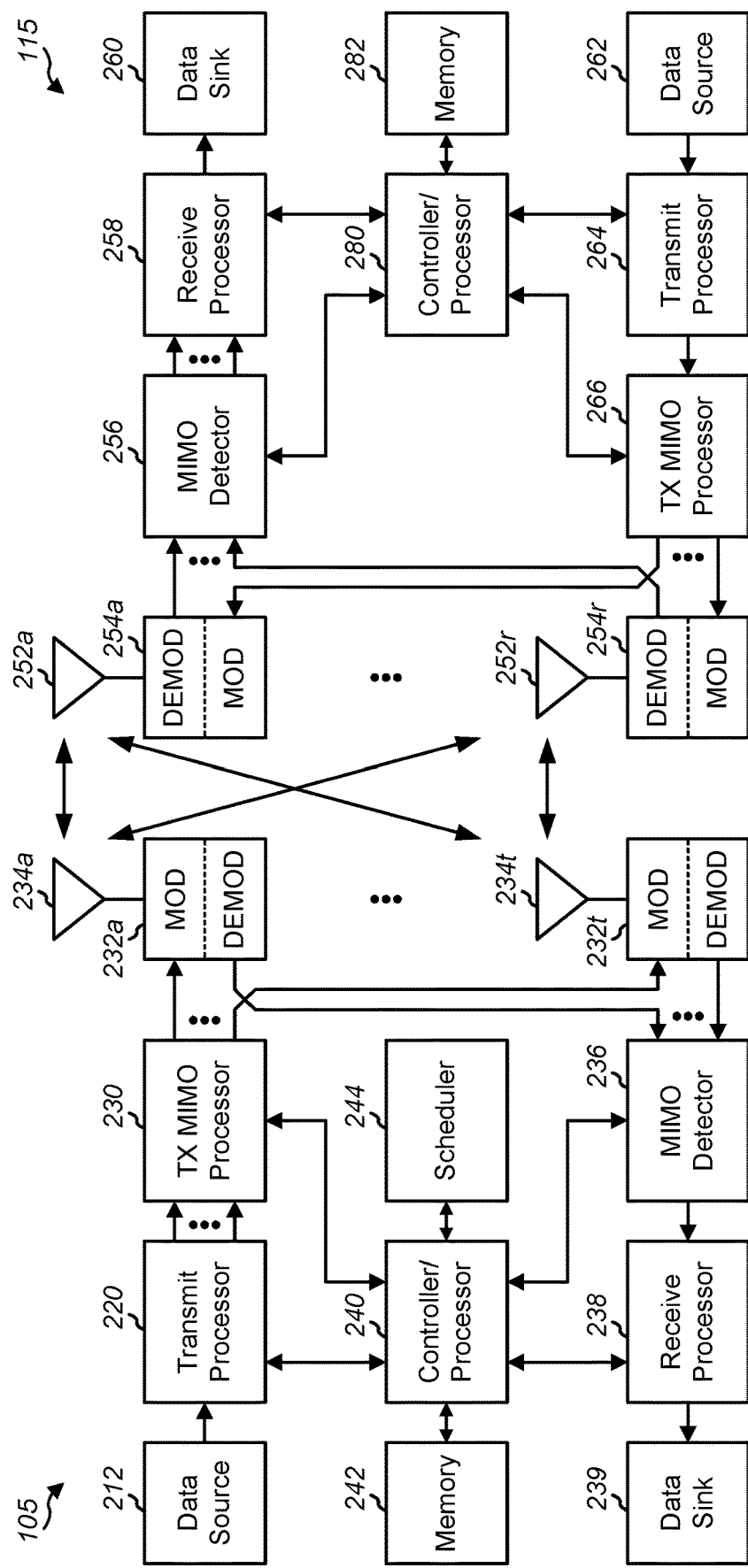
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller/processor 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller/processor 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, etc.), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller/processor 240.

The controllers/processors 240 and 280 may direct the operation at the base station 105 and the UE 115, respectively. The controller/processor 240 or other processors and modules at the base station 105 or the controller/processor 280 or other processors and modules at the UE 115 may perform or direct the execution of various processes for the techniques described herein, such as to perform or direct the execution illustrated in FIGS. 3-7, or other processes for the techniques described herein. The memories 242 and 282 may store data and program codes for the base station 105 and The UE 115, respectively. The scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge/negative-acknowledge (ACK/NACK) feedback for its own transmitted packets as a proxy for collisions.

Figure 3:
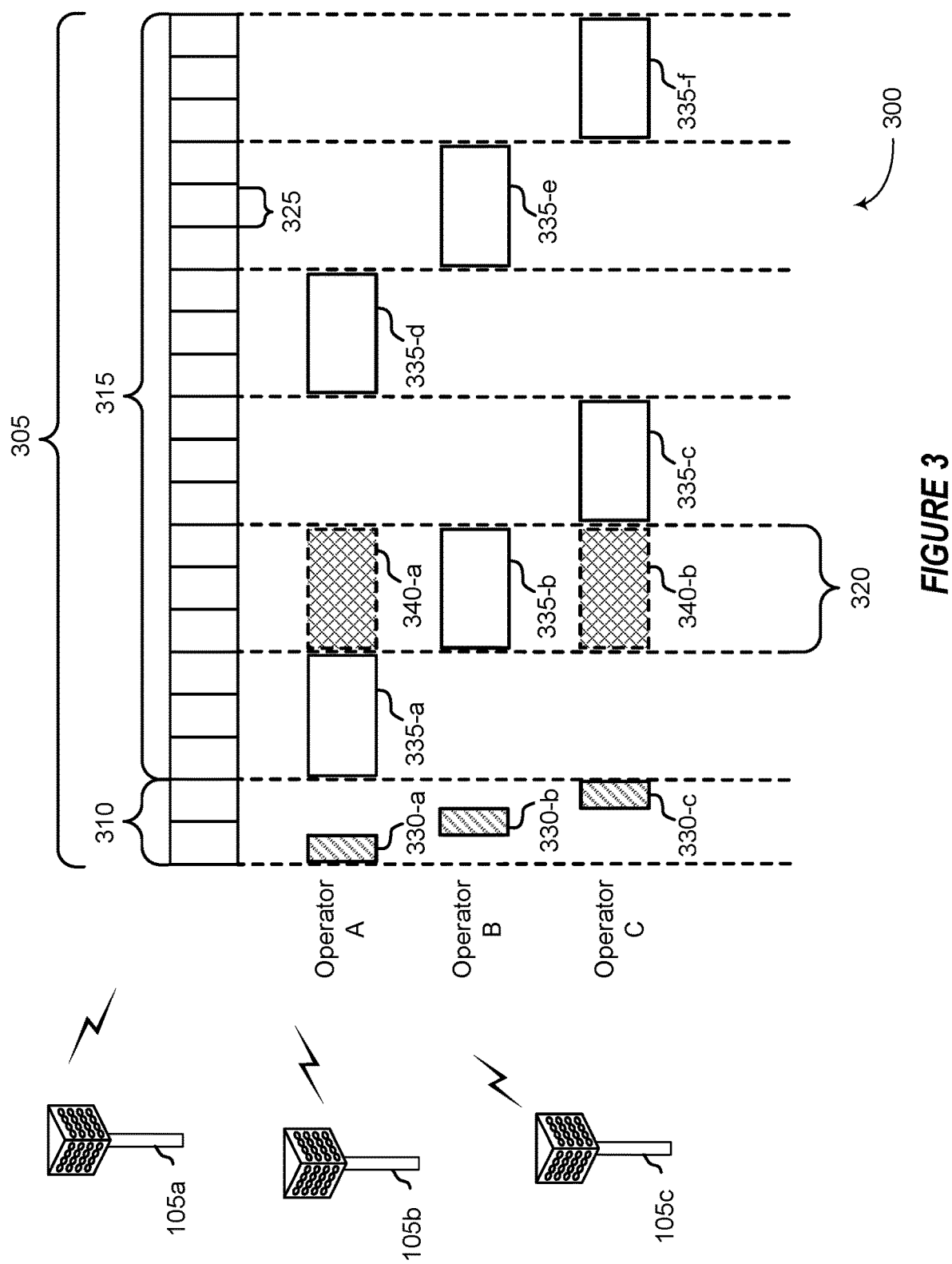
FIG. 3 is a diagram illustrating an example of frame based operation.

FIG. 3 illustrates an example of a timing diagram 300 for coordinated resource partitioning. The timing diagram 300 includes a superframe 305, which may represent a fixed duration of time (such as 20 ms). The superframe 305 may be repeated for a given communication session and may be used by a wireless system such as the 5G network 100 described with reference to FIG. 1. The superframe 305 may be divided into intervals such as an acquisition interval (A-INT) 310 and an arbitration interval 315. As described in more detail below, the A-INT 310 and the arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (such as 1 ms). While the timing diagram 300 illustrates three different network operating entities (Operator A, Operator B, Operator C), the number of network operating entities using the superframe 305 for coordinated communications may be greater than or fewer than the number illustrated in the timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by the Operator A, such as through the base station 105a, resources 330-b may be reserved for exclusive communications by the Operator B, such as through the base station 105b, and resources 330-c may be reserved for exclusive communications by the Operator C, such as through the base station 105c. Since the resources 330-a are reserved for exclusive communications by the Operator A, neither the Operator B nor the Operator C can communicate during the resources 330-a, even if the Operator A chooses not to communicate during those resources. That is, access to exclusive resources is limited to the designated network operator. Similar restrictions apply to the resources 330-b for the Operator B and the resources 330-c for the Operator C. The wireless nodes of the Operator A (such as the UEs 115 or the base stations 105) may communicate any information desired during their exclusive resources 330-a, such as control information or data.

When communicating over an exclusive resource, a network operating entity does not need to perform any medium sensing procedures (such as listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (such as no hidden node problem). In some examples, the A-INT 310 is used to transmit control information, such as synchronization signals (such as SYNC signals), system information (such as system information blocks (SIBs)), paging information (such as physical broadcast channel (PBCH) messages), or random access information (such as random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by the Operator A and may therefore be referred to as a G-INT for the Operator A (such as G-INT-OpA). Similarly, resources 335-b may be prioritized for the Operator B, resources 335-c may be prioritized for the Operator C, resources 335-d may be prioritized for the Operator A, resources 335-e may be prioritized for the Operator B, and resources 335-f may be prioritized for the Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (such as resources 340-a and the resources 335-b), these resources represent the same time resources with respect to the superframe 305 (such as the resources occupy the same sub-interval 320), but the resources are separately designated to illustrate that the same time resources can be classified differently for different operators.

When resources are assigned with priority for a certain network operating entity (such as a G-INT), that network operating entity may communicate using those resources without having to wait or perform any medium sensing procedures (such as LBT or CCA). For example, the wireless nodes of the Operator A are free to communicate any data or control information during the resources 335-a without interference from the wireless nodes of the Operator B or the Operator C.

A network operating entity may additionally signal to another operator that it intends to use a particular G-INT. For example, referring to the resources 335-a, the Operator A may signal to the Operator B and the Operator C that it intends to use the resources 335-a. Such signaling may be referred to as an activity indication. Moreover, since the Operator A has priority over the resources 335-a, the Operator A may be considered as a higher priority operator than both the Operator B and the Operator C. However, as discussed above, the Operator A does not have to send signaling to the other network operating entities to ensure interference-free transmission during the resources 335-a because the resources 335-a are assigned with priority to the Operator A.

Similarly, a network operating entity may signal to another network operating entity that it intends not to use a particular G-INT. This signaling may also be referred to as an activity indication. For example, referring to the resources 335-b, the Operator B may signal to the Operator A and the Operator C that it intends not to use the resources 335-b for communication, even though the resources are assigned with priority to the Operator B. With reference to the resources 335-b, the Operator B may be considered a higher priority network operating entity than the Operator A and the Operator C. In such cases, the Operators A and C may attempt to use resources of sub-interval 320 on an opportunistic basis. Thus, from the perspective of the Operator A, the sub-interval 320 that contains resources 335-b may be considered an opportunistic interval (O-INT) for the Operator A (such as O-INT-OpA). For illustrative purposes, resources 340-a may represent the O-INT for the Operator A. Also, from the perspective of the Operator C, the same sub-interval 320 may represent an O-INT for the Operator C with corresponding resources 340-b. The resources 340-a, 335-*b*, and 340-*b* all represent the same time resources (such as a particular sub-interval 320), but are identified separately to signify that the same resources may be considered as a G-INT for some network operating entities and yet as an O-INT for others.

To utilize resources on an opportunistic basis, the Operator A and Operator C may perform medium-sensing procedures to check for communications on a particular channel before transmitting data. For example, if the Operator B decides not to use the resources 335-*b* (such as G-INT-OpB), then the Operator A may use those same resources (such as represented by resources 340-*a*) by first checking the channel for interference (such as LBT) and then transmitting data if the channel was determined to be clear. Similarly, if the Operator C wanted to access resources on an opportunistic basis during the sub-interval 320 (such as use an O-INT represented by the resources 340-*b*) in response to an indication that the Operator B was not going to use its G-INT, the Operator C may perform a medium sensing procedure and access the resources if available. In some cases, two operators (such as the Operator A and the Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (such as request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example, an operating entity may employ CoMP and dynamic time division duplex (TDD) in a G-INT and opportunistic CoMP in an O-INT as needed.

In the example illustrated in FIG. 3, each sub-interval 320 includes a G-INT for one of the Operator A, B, or C. However, in some cases, one or more sub-intervals 320 may include resources that are neither reserved for exclusive use nor reserved for prioritized use (such as unassigned resources). Such unassigned resources may be considered an O-INT for any network operating entity, and may be accessed on an opportunistic basis as described above.

In some examples, each subframe 325 may contain 14 symbols (such as 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some examples, an ITC may contain one or more subframes 325 operating contiguously upon medium occupation. In some cases, there may be a maximum of eight network operators in an A-INT 310 (such as with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of the superframe 305 may be more or less than 20 milliseconds (ms). Also, the number, duration, and location of the sub-intervals 320 and the subframes 325 may differ from the configuration illustrated. Also, the types of resource designations (e.g., exclusive, prioritized, unassigned) may differ or include more or less sub-designations.

Figure 4:
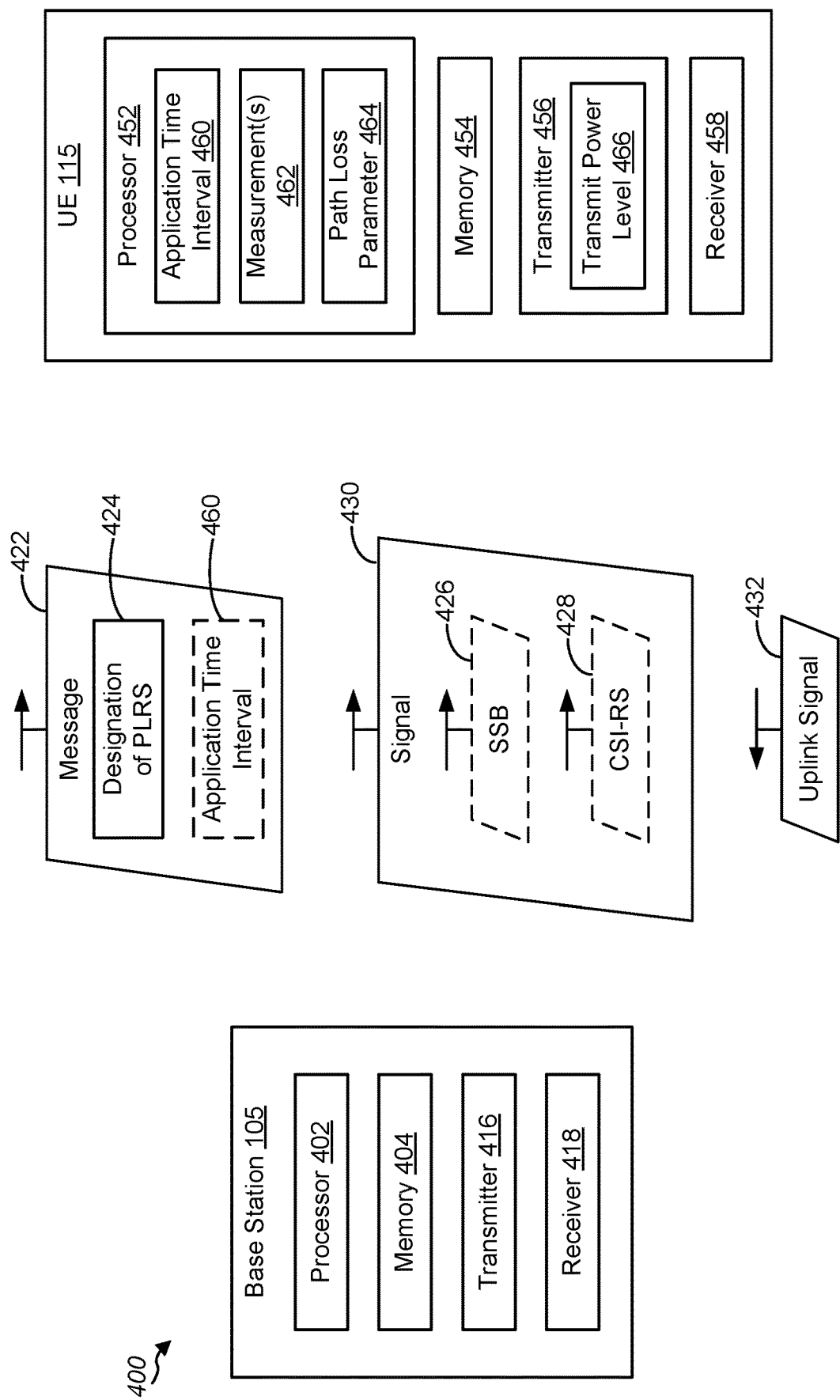
FIG. 4 is a block diagram illustrating an example wireless communication system.

FIG. 4 is a block diagram illustrating an example wireless communication system 400. The wireless communication system 400 may include one or more base stations (BSs), such as the base station 105. The wireless communication system 400 may further include one or more UEs, such as the UE 115.

The base station 105 may include one or more processors (such as a processor 402) and a memory 404. In some examples, the processor 402 includes or corresponds to the controller/processor 240, and the memory 404 includes or corresponds to the memory 242. The base station 105 may further include a transmitter 416 and a receiver 418. The processor 402 may be coupled to the memory 404, to the transmitter 416, and to the receiver 418. In some examples, the transmitter 416 and the receiver 418 include one or more components described with reference to FIG. 2, such as one or more of the modulator/demodulators 232*a-t*, the MIMO detector 236, the receive processor 238, the transmit processor 220, or the TX MIMO processor 230.

The UE 115 may include one or more processors (such as a processor 452) and a memory 454. In some examples, the processor 452 includes or corresponds to the controller/processor 280, and the memory 454 includes or corresponds to the memory 282. The UE 115 may further include a transmitter 456 and a receiver 458. The processor 452 may be coupled to the memory 454, to the transmitter 456, and to the receiver 458. In some examples, the transmitter 456 and the receiver 458 include one or more components described with reference to FIG. 2, such as one or more of the modulator/demodulators 254a-r, the MIMO detector 256, the receive processor 258, the transmit processor 264, or the TX MIMO processor 266.

During operation, the base station 105 may transmit a message 422 indicating a designation 424 of a signal 430 as a path loss reference signal (PLRS). The designation 424 may indicate to the UE 115 that the UE 115 is to receive, track, or identify the signal 430 as the PLRS. To illustrate, in some examples, the message 422 indicates a change of the PLRS from one signal to another signal, such as from a synchronization signal block (SSB) 426 or to channel state information reference signal (CSI-RS) 428. In such examples, the designation 424 may indicate that the UE 115 is to track the CSI-RS 428 as the PLRS instead of tracking the SSB 426 as the PLRS. In another example, the designation 424 may indicate another change of the PLRS, such as from the CSI-RS 428 to the SSB 426. In such examples, the designation 424 may indicate that the UE 115 is to track the SSB 426 as the PLRS instead of tracking the CSI-RS 428 as the PLRS.

In some examples, the message 422 corresponds to a downlink control information (DCI) message, a medium access control (MAC) control element (MAC-CE), or a radio resource control (RRC) configuration message. In some implementations, the message 422 corresponds to a DCI message that has a DCI format and that schedules a downlink transmission or an uplink transmission. To illustrate, in some examples, the message 422 may schedule a downlink transmission and may have a DCI format 1_0, a DCI format 1_1, or a DCI format 1_2, as illustrative examples. In some other examples, the message 422 may schedule an uplink transmission and may have a DCI format 0_0, a DCI format 0_1, or a DCI format 0_2, as illustrative examples.

The designation 424 of the signal 430 as the PLRS is associated with an application time interval 460. Upon expiration of the application time interval 460, the UE 115 may select a transmit power level 466 in accordance with the designation 424 (for example, based on the CSI-RS 428 instead of based on the SSB 426). The application time interval 460 may correspond to a "warm up" time interval during which the UE 115 changes from measuring one signal as the PLRS to measuring another signal as the PLRS, such as from measuring the SSB 426 to measuring the CSI-RS 428. After expiration of the application time interval 460, the UE 115 may select (or apply) the transmit power level 466 according to the designation 424. For example, the UE 115 may apply the transmit power level 466 to one or more uplink signals, such as an uplink signal 432.

To further illustrate, the UE 115 may perform one or more measurements 462 based on the signal 430 and may select a path loss parameter 464 based on the one or more measurements 462. The UE 115 may select the transmit power level 466 based on the one or more measurements 462. In some examples, the UE 115 performs at least one measurement of the one or more measurements 462 after receiving the message 422 and prior to the expiration of the application time interval 460.

As used herein, selecting the transmit power level 466 may include performing a determination (or calculation) of the transmit power level 466, applying the transmit power level 466 to the transmitter 456 (such as by changing a power amplifier output voltage or other characteristic of the transmitter 456), or both. To illustrate, in some examples, selecting the transmit power level 466 may include determining (or calculating) the transmit power level 466 prior to expiration of the application time interval 460 and may further include applying (or setting) the transmit power level 466 to the transmitter 456 after expiration of the application time interval 460. In some other examples, the UE 115 may perform both the determination (or calculation) of the transmit power level 466 and the application (or setting) of the transmit power level 466 after expiration of the application time interval 460.

In some examples, the base station 105 determines the application time interval 460 and indicates the application time interval 460 to the UE 115, such as via an indication that may be included in the message 422. In some other examples, the UE 115 may determine the application time interval 460, such as without an explicit indication of the application time interval 460 from the base station 105. The application time interval 460 may be determined based on one or more parameters, Certain examples are provided for illustration. Although such examples may be described separately for convenience, such examples may be combined without departing from the scope of the disclosure.

In some implementations, the PLRS is associated with at least one of a first channel, a first reference signal, or a first transmission configuration indicator (TCI) state, and the application time interval 460 is associated with whether the UE has previously tracked the signal 430 for a second channel, as a second reference signal, for a second TCI state, or a combination thereof. In some examples, if the UE has previously tracked the signal 430 as the second reference signal, the UE 115 updates a TCI state association from a first PLRS identifier (ID) to a second PLRS identifier.

Alternatively or in addition, the UE 115 may receive the signal 430 according to a periodicity, and the application time interval 460 may be associated with the periodicity.

Alternatively or in addition, the application time interval 460 may be associated with at least one of a target channel associated with the PLRS or a signal type associated with the signal 430. For example, the channel may correspond to a physical uplink control channel (PUCCH), a codebook-based physical uplink shared channel (PUSCH), or a non-codebook-based PUSCH, and the signal type may correspond to a persistently (P) scheduled type, a semi-persistently scheduled (SPS) type, an a-periodically (AP) scheduled type, or a reference signal type (such as a sounding reference signal (SRS) type), as illustrative examples.

Alternatively or in addition, the application time interval 460 may be associated with a type of transmission configuration indicator (TCI) state associated with the PLRS. To illustrate, the type of TCI state may correspond to one of a joint downlink (DL) and uplink (UL) common TCI state that is associated with a common beam for at least one DL channel and for at least one UL channel, a separate UL common TCI state associated with a common beam for multiple UL channels, a single UL channel TCI state associated with a beam for a single UL channel, or an UL spatial relation info type that is associated with multiple component carriers (CCs).

Alternatively or in addition, the application time interval 460 may be associated with whether a common antenna panel of the UE 115 is used to receive the message 422 and the signal 430 or separate antenna panels of the UE 115 are used to receive the message 422 and the signal 430.

Alternatively or in addition, the application time interval 460 may be associated with whether a common antenna panel of the UE 115 is used to transmit an acknowledgement (ACK) of the message 422 and the signal 430 or separate antenna panels of the UE 115 are used to transmit the ACK and the signal 430.

Alternatively or in addition, the application time interval 460 may be associated with a source type associated with the signal 430. For example, the source type may indicate that a base station transmitting the signal 430 (such as the base station 105) is one of a serving cell of the UE 115 or a non-serving cell of the UE 115. As another example, the source type may indicate that a transmission configuration indicator (TCI) state associated with the PLRS is associated with a serving cell of the UE 115 or with a non-serving cell of the UE 115.

Alternatively or in addition, the application time interval 460 may be associated with at least one of whether the signal 430 is tracked for one component carrier (CC) or for multiple CCs, a number of CCs associated with the signal 430, or a number of CCs used by the UE 115 for downlink control information (DCI) monitoring (such as DCI monitoring used to monitor for the message 422).

Alternatively or in addition, the application time interval 460 may correspond to a number or symbols or to a number of slots that is associated with a numerology associated with a downlink channel used to transmit the message 422.

Alternatively or in addition, the transmit power level 466 may be associated with an uplink channel (such as where the uplink signal 432 is transmitted via the uplink channel), and the application time interval 460 may correspond to a number or symbols or to a number of slots that is based on a numerology associated with the uplink channel.

Alternatively or in addition, the transmit power level 466 may be associated with an uplink channel, and the application time interval 460 may correspond to a number or symbols or to a number of slots that is based on a numerology associated with the uplink channel and that is further based on a numerology associated with a downlink channel used to transmit the message 422.

Alternatively or in addition, the application time interval 460 may be associated with a sum of a first number (also referred to herein as "X") of symbols or slots and a second number (also referred to herein as "Y") of symbols or slots. The first number may correspond to a value that is associated with at least one of a capability of the UE 115, a configuration of the base station 105, a value specified by a wireless communication protocol (such as a 5G NR wireless communication protocol), or a periodicity of the signal 430. In some examples, the second number may be selected to match a duration of symbols or slots in terms of a numerology associated with a downlink channel used to transmit the message 422 if the numerology associated with the downlink channel is less than a numerology of an uplink channel associated with the transmit power level 466. In some other examples, the second number corresponds to zero if the numerology associated with the downlink channel used to transmit the message 422 is greater than or equal to the numerology of the uplink channel associated with the transmit power level 466. To further illustrate, the application time interval 460 may be selected according to the example of Equation 1:

$$T = X + d \cdot \frac{2^{\mu_1}}{2^{\mu_2}} \text{ if } \mu_2 < \mu_1;$$
$$T = X \text{ if } \mu_2 \geq \mu_1.$$

(Equation 1)

In the example of Equation 1, T may correspond to the application time interval 460, $\mu_1$ may correspond to a numerology of the uplink channel associated with the transmit power level 466, $\mu_2$ may correspond to a numerology of the downlink channel used to transmit the message 422, and d may correspond to a value that is associated with or that is based on the numerology of the downlink channel used to transmit the message 422. To illustrate, d may be selected from among a group of values of, such as 8, 8, and 14 based on whether $\mu_2$ corresponds to 0, 1, or 2, respectively. In some examples, d may be selected based on a beam failure recovery response (BFRR) (such as any of the examples disclosed in 3GPP TS 38.214). In some examples, a numerology may indicate or may be associated with one or more of a subcarrier spacing (SCS), a number of slots per subframe, or a slot length. In some examples, $\mu_1$ may correspond to $\log_2(SCS_{UL}/15 \text{ kHz})$, where $\log_2$ indicates a binary logarithm, and where $SCS_{UL}$ indicates an SCS of the uplink channel associated with the transmit power level 466. In some examples, $\mu_2$ may correspond to $\log_2(SCS_{DL}/15 \text{ kHz})$, where $\log_2$ indicates a binary logarithm, and where $SCS_{DL}$ indicates an SCS of the downlink channel used to transmit the message 422. To further illustrate, in some illustrative examples, $SCS_{DL}$ may correspond to 15 kHz, 30 kHz, or 60 kHz, and $\mu_2$ may correspond to 0, 1, or 2, respectively.

Alternatively or in addition, the message 422 may indicate a PLRS update for multiple component carriers (CCs), and the application time interval 460 may be associated with the multiple CCs. In some other examples, the message 422 may indicate a PLRS update for the multiple CCs, and the application time interval 460 may be associated with fewer than all of the CCs.

Alternatively or in addition, the message 422 may include an indication that the designation 424 of the signal 430 as the PLRS is to apply to multiple component carriers (CCs), and the application time interval 460 may correspond to a common application time interval that is associated with the multiple CCs. In some examples, the common application time interval begins at an end of a final slot associated with a transmission including the message 422 or at an end of a final slot associated with an acknowledgement of the message 422 transmitted by the UE 115. In some examples, the common application time interval is associated with a numerology of a downlink channel associated with the message 422 or a numerology in one of the multiple CCs of an uplink channel associated with the transmit power level 466. The numerology of a CC or a channel may refer to a tone spacing or symbol length applied in the CC or channel. In some examples, the multiple CCs of the uplink channel may have different tone spacings, and a tone spacing of one of the multiple CCs is selected to determine a common application time interval based on a particular rule. For instance, the largest tone spacing associated with the multiple CCs may be selected to determine the common application interval. In some examples, the message 422 indicates a single bandwidth part (BWP) and component carrier (CC), the CC is included in a radio resource control (RRC) configured list of CCs stored by the UE 115, and the UE receives the signal 430 as the PLRS for each CC indicated by the list of CCs.

Alternatively or in addition, the application time interval 460 may correspond to a number of milliseconds, slots, or symbols that begins at an end of a final slot associated with a transmission including the message 422 or at an end of the transmission including the message 422. In some other examples, the application time interval 460 may correspond to a number of milliseconds, slots, or symbols that begins at an end of a final slot associated with associated with an acknowledgement of the message transmitted by the UE or at an end of the acknowledgement. To further illustrate, in some examples, the message corresponds to a downlink control information (DCI) message scheduling a downlink transmission, and the acknowledgement is associated with the downlink transmission. In some other examples, the message 422 corresponds to a downlink control information (DCI) message scheduling an uplink transmission, and the acknowledgement is included in the uplink transmission. In some other examples, the message 422 does not schedule an uplink or downlink transmission, and the acknowledgement corresponds to a dedicated bit that is included in a physical uplink control channel (PUCCH) transmission by the UE 115 or in a physical uplink shared channel (PUSCH) transmission by the UE 115.

In some examples, the UE 115 transmits an indication of a capability of the UE 115 to the base station 105. In some implementations, the application time interval 460 is associated with the capability of the UE 115, such as where the capability and the application time interval 460 correspond to a threshold processing time used by the UE 115 to change from tracking one reference signal as the PLRS to tracking another reference signal as the PLRS. In some other implementations, the UE 115 receives from the base station 105, based on the capability of the UE 115, an indication of the application time interval 460, where the application time interval 460 is selected by the base station 105 to satisfy the capability of the UE 115. In some other examples, the UE 115 receives from the base station 105, based on the capability of the UE 115, an indication of the application time interval 460, where the application time interval 460 is selected by the base station 105 based on one or more selection criteria while satisfying the capability of the UE 115.

Alternatively or in addition, the message 422 may indicate that the signal 430 is to serve as a PLRS for each of multiple channels or reference signals each associated with multiple respective application time intervals.

Alternatively or in addition, the message 422 may indicate a common beam transmission configuration indicator (TCI) state to be applied to multiple channels or reference signals associated with multiple respective application time intervals. The UE 115 may select the application time interval 460 from among the multiple respective application time intervals. In some examples, the UE 115 selects the largest application time interval from among the multiple respective application time intervals as the application time interval 460. In some other examples, the base station 105 selects the largest application time interval from among the multiple respective application time intervals as the application time interval 460 and indicates the application time interval 460 to the UE 115. In some other examples, the largest application time interval is selected (such as by the base station 105 or by the UE 115) from among the multiple respective application time intervals as the application time interval 460 using one or more selection criteria.

Although certain examples have been described with reference to a PLRS, other examples are also within the scope of the disclosure. For example, the message 422 may indicate an update to one or more other parameters (alternatively or in addition to the designation 424) that may be subject to the application time interval 460 (or another application time interval). In an example, the UE 115 receives a message indicating a modification of one or more parameters associated with an uplink power setting of the UE 115, the modification of the one or more parameters is to take effect upon expiration of an application time interval (such as the application time interval 460 or another application time interval). After the expiration of the application time interval, the UE 115 may apply the modified one or more parameters and may select the uplink power setting based on the modified one or more parameters.

One or more aspects described with reference to FIG. 4 may improve performance of a wireless communication system. For example, use of the application time interval 460 may enable the UE 115 to "warm up" to a change in reference signal, such as by sampling the reference signal over one or more occasions prior to updating the transmit power level 466 based on the reference signal. As a result, the path loss parameter 464 may be more accurate as compared to certain systems that use an "immediate" change in reference signal to determine a transmit power level. Accordingly, the transmit power level 466 may more closely reflect the path loss between the base station 105 and the UE 115 as compared to certain other techniques, which may reduce or avoid instances of lost packets (such as if the transmit power level 466 is set too low to compensate for the path loss) or which may reduce power consumption of the UE 115 (such as if the transmit power level 466 is set higher than appropriate for the particular path loss). Further, the application time interval 460 may be selected (or "customized") according to one or more criteria, such as one or more of the criteria described with reference to FIG. 4. As a result, the duration of the application time interval 460 may be increased or decreased according to the particular circumstances.

Figures 5, 6:
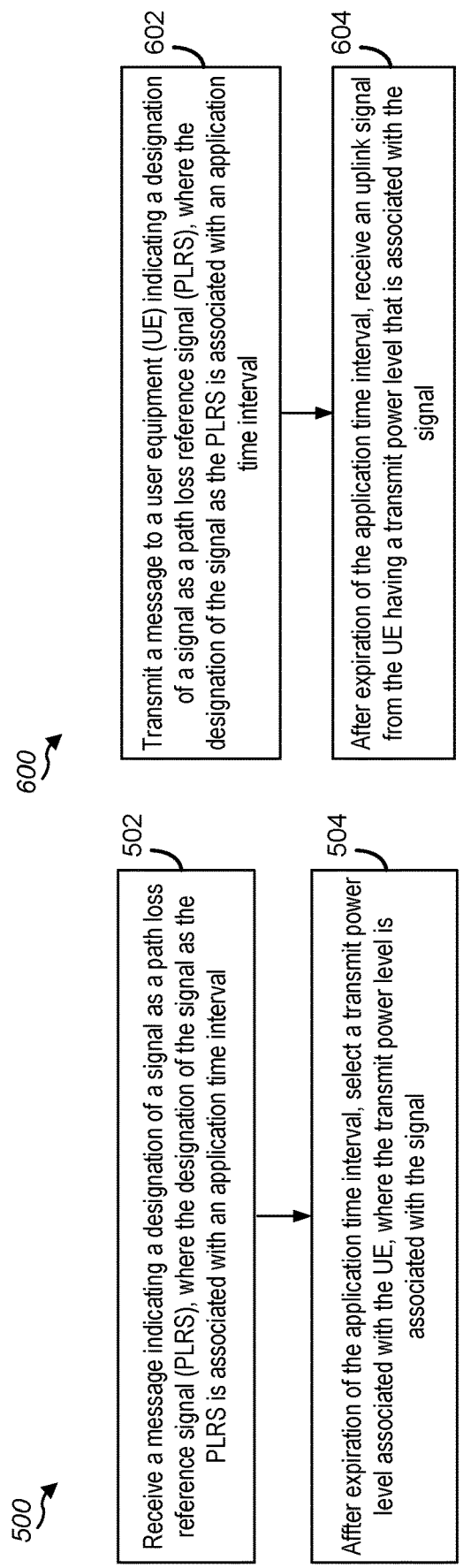
FIG. 5 is a flow chart illustrating an example process of wireless communication performed at a UE.
FIG. 6 is a flow chart illustrating an example process of wireless communication performed at a base station.

FIG. 5 is a flow chart illustrating an example process 500 of wireless communication performed at a UE. In some examples, the process 500 is performed by the UE 115.

The process 500 includes receiving a message indicating a designation of a signal as a path loss reference signal (PLRS), at 502. The designation of the signal as the PLRS is associated with an application time interval. For example, the UE 115 may receive the message 422 indicating the designation 424 of the signal 430 as the PLRS, and the designation 424 of the signal 430 as the PLRS may be associated with the application time interval 460.

The process 500 further includes, after expiration of the application time interval, selecting a transmit power level associated with the UE, at 504. The transmit power level is associated with the signal. For example, the UE 115 may select (or apply) the transmit power level 466 after expiration of the application time interval 460, such as by transmitting the uplink signal 432 based on the transmit power level 466.

FIG. 6 is a flow chart illustrating an example process 600 of wireless communication performed at a base station. In some examples, the process 600 is performed by the base station 105.

The process 600 includes transmitting a message to a UE indicating a designation of a signal as a PLRS, at 602. The designation of the signal as the PLRS is associated with an application time interval. For example, the base station 105 may transmit the message 422 indicating the designation 424 of the signal 430 as the PLRS, and the designation 424 of the signal 430 as the PLRS may be associated with the application time interval 460.

The process 600 further includes, after expiration of the application time interval, receiving an uplink signal from the UE having a transmit power level that is associated with the signal, at 604. For example, the base station 105 may receive the uplink signal 432 from the UE 115, and the uplink signal 432 may have the transmit power level 466.

Figure 7:
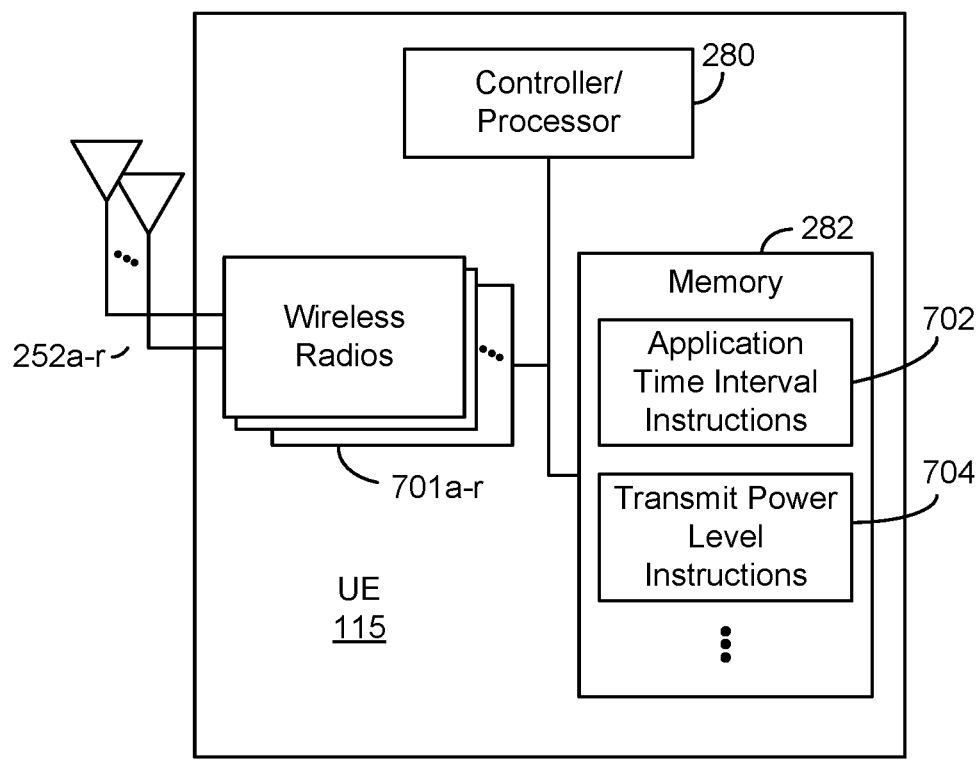
FIG. 7 is a block diagram illustrating an example UE.

FIG. 7 is a block diagram illustrating an example UE 115. The UE 115 may include structure, hardware, or components illustrated in FIG. 2. For example, the UE 115 may include the controller/processor 280, which may execute instructions stored in the memory 282. Using the controller/processor 280, the UE 115 may transmit and receive signals via wireless radios 701a-r and antennas 252a-r. The wireless radios 701a-r may include one or more components or devices described herein, such as the modulator/demodulators 254a-r, the MIMO detector 256, the receive processor 258, the transmit processor 264, the TX MIMO processor 266, one or more other components or devices, or a combination thereof.

The memory 282 may store instructions executable by the controller/processor 280 to perform one or more operations described herein. For example, the memory 282 may store application time interval instructions 702 executable by the controller/processor 280 to determine or identify the application time interval 460 based on receiving the message 422. As another example, the memory 282 may store transmit power level instructions 704 executable by the controller/processor 280 to select (or apply) the transmit power level 466 after expiration of the application time interval 460.

Figure 8:
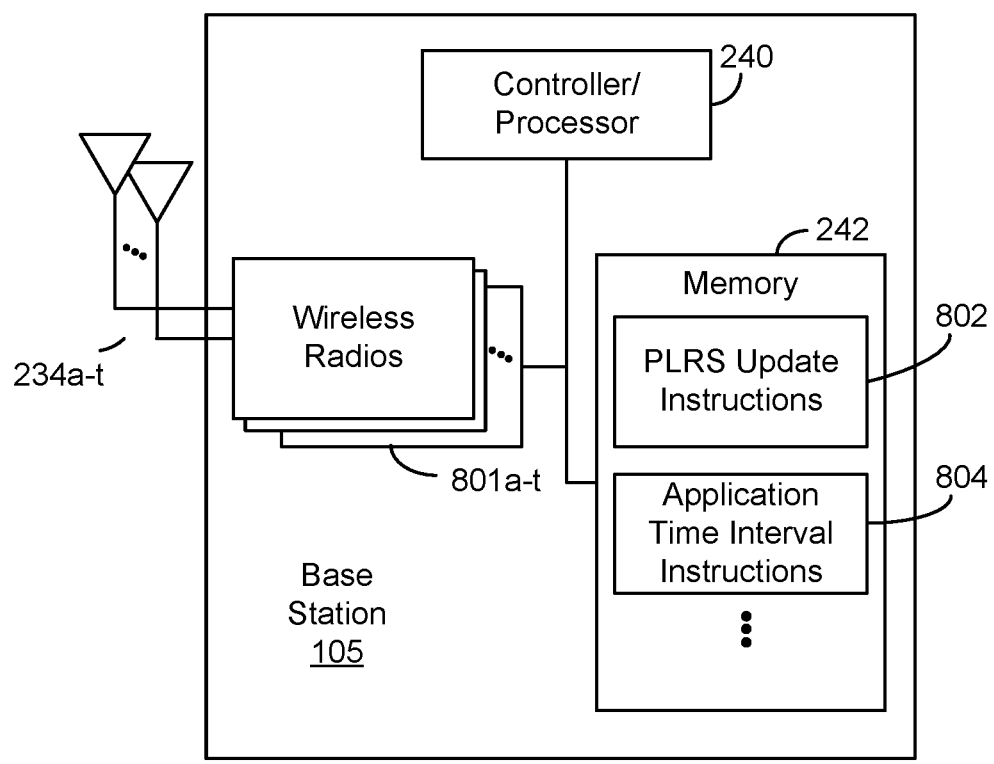
FIG. 8 is a block diagram illustrating an example base station (B S).

FIG. 8 is a block diagram illustrating an example base station. The base station 105 may include structure, hardware, and components illustrated in FIG. 2. For example, the base station 105 may include the controller/processor 240, which may execute instructions stored in memory 242. Under control of the controller/processor 240, the base station 105 may transmit and receive signals via wireless radios 801a-t and antennas 234a-t. The wireless radios 801a-t may include one or more components or devices described herein, such as the modulator/demodulators 232a-t, the MIMO detector 236, the receive processor 238, the transmit processor 220, the TX MIMO processor 230, one or more other components or devices, or a combination thereof.

The memory 242 may store instructions executable by the controller/processor 240 to perform one or more operations described herein. For example, the memory 242 may store PLRS update instructions 802 executable by the controller/processor 240 to transmit the message 422 indicating the designation 424. As another example, the memory 242 may store application time interval instructions 804 executable by the controller/processor 240 to determine the application time interval 460.

In a first aspect, an apparatus is configured to receive a message indicating a designation of a signal as a path loss reference signal (PLRS). The designation of the signal as the PLRS is associated with an application time interval. The apparatus is further configured to, after expiration of the application time interval, select a transmit power level associated with the UE. The transmit power level is associated with the signal. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the apparatus is configured to perform one or more measurements based on the signal and to select a path loss parameter based on the one or more measurements. The transmit power level is based on the path loss parameter.

In a third aspect, alone or in combination with one or more of the first aspect through the second aspect, at least one measurement of the one or more measurements is performed after receiving the message and prior to the expiration of the application time interval.

In a fourth aspect, alone or in combination with one or more of the first aspect through the third aspect, the message indicates a change of the PLRS from another signal to the signal. The other signal corresponds to one of a synchronization signal block (SSB) or a channel state information reference signal (CSI-RS). The signal corresponds to the other of the SSB or the CSI-RS.

In a fifth aspect, alone or in combination with one or more of the first aspect through the fourth aspect, the message corresponds to a downlink control information (DCI) message, a medium access control (MAC) control element (MAC-CE), or a radio resource control (RRC) configuration message.

In a sixth aspect, alone or in combination with one or more of the first aspect through the fifth aspect, the PLRS is associated with at least one of a first channel, a first reference signal, or a first transmission configuration indicator (TCI) state.

In a seventh aspect, in combination with the sixth aspect, the application time interval is associated with whether the UE has previously tracked the signal for a second channel, as a second reference signal, for a second TCI state, or a combination thereof.

In an eighth aspect, in combination with one or more of the sixth aspect through the seventh aspect, the UE has previously tracked the signal as the second reference signal. The apparatus is configured to update a TCI state association from a first PLRS identifier (ID) to a second PLRS identifier.

In a ninth aspect, alone or in combination with one or more of the first aspect through the eighth aspect, the UE receives the signal according to a periodicity. The application time interval is associated with the periodicity.

In a tenth aspect, alone or in combination with one or more of the first aspect through the ninth aspect, the application time interval is associated with at least one of a target channel associated with the PLRS or a signal type associated with the signal.

In an eleventh aspect, in combination with the tenth aspect, the channel corresponds to a physical uplink control channel (PUCCH), a codebook-based physical uplink shared channel (PUSCH), or a non-codebook-based PUSCH.

In a twelfth aspect, in combination with one or more of the tenth aspect through the eleventh aspect, the signal type corresponds to a persistently (P) scheduled type, a semi-persistently scheduled (SPS) type, or an a-periodically (AP) scheduled type.

In a thirteenth aspect, alone or in combination with one or more of the first aspect through the twelfth aspect, the application time interval is associated with a type of transmission configuration indicator (TCI) state associated with the PLRS.

In a fourteenth aspect, in combination with the thirteenth aspect, the type of TCI state corresponds to one of a joint downlink (DL) and uplink (UL) common TCI state that is associated with a common beam for at least one DL channel and for at least one UL channel, a separate UL common TCI state associated with a common beam for multiple UL channels, a single UL channel TCI state associated with a beam for a single UL channel, or an UL spatial relation info type that is associated with multiple component carriers (CCs).

In a fifteenth aspect, alone or in combination with one or more of the first aspect through the fourteenth aspect, the application time interval is associated with whether a common antenna panel of the UE is used to receive the message and the signal or separate antenna panels of the UE are used to receive the message and the signal.

In a sixteenth aspect, alone or in combination with one or more of the first aspect through the fifteenth aspect, the application time interval is associated with whether a common antenna panel of the UE is used to transmit an acknowledgement (ACK) of the message and the signal or separate antenna panels of the UE are used to transmit the ACK and the signal.

In a seventeenth aspect, alone or in combination with one or more of the first aspect through the sixteenth aspect, the application time interval is associated with a source type associated with the signal.

In an eighteenth aspect, in combination with the seventeenth aspect, the source type indicates that a base station transmitting the signal is one of a serving cell of the UE or a non-serving cell of the UE.

In a nineteenth aspect, in combination with one or more of the seventeenth aspect through the eighteenth aspect, the source type indicates that a transmission configuration indicator (TCI) state associated with the PLRS is associated with a serving cell of the UE or with a non-serving cell of the UE.

In a twentieth aspect, alone or in combination with one or more of the first aspect through the nineteenth aspect, the application time interval is associated with at least one of whether the signal is tracked for one component carrier (CC) or for multiple CCs, a number of CCs associated with the signal, or a number of CCs used by the UE for downlink control information (DCI) monitoring.

In a twenty-first aspect, alone or in combination with one or more of the first aspect through the twentieth aspect, the application time interval corresponds to a number or symbols or to a number of slots that is associated with a numerology associated with a downlink channel used to transmit the message.

In a twenty-second aspect, alone or in combination with one or more of the first aspect through the twenty-first aspect, the transmit power level is associated with an uplink channel, and the application time interval corresponds to a number or symbols or to a number of slots that is based on a numerology associated with the uplink channel.

In a twenty-third aspect, alone or in combination with one or more of the first aspect through the twenty-second aspect, the transmit power level is associated with an uplink channel, and the application time interval corresponds to a number or symbols or to a number of slots that is based on a numerology associated with the uplink channel and that is further based on a numerology associated with a downlink channel used to transmit the message.

In a twenty-fourth aspect, alone or in combination with one or more of the first aspect through the twenty-third aspect, the application time interval is associated with a sum of a first number of symbols or slots and a second number of symbols or slots. The first number corresponds to a value that is associated with at least one of a capability of the UE, a configuration of a base station, a value specified by a wireless communication protocol, or a periodicity of the signal.

In a twenty-fifth aspect, in combination with the twenty-fourth aspect, the second number is selected to match a duration of symbols or slots in terms of a numerology associated with a downlink channel used to transmit the message if the numerology associated with a downlink channel used to transmit the message being less than a numerology of an uplink channel associated with the transmit power level.

In a twenty-sixth aspect, in combination with one or more of the twenty-fourth aspect through the twenty-fifth aspect, the second number corresponds to zero if a numerology associated with a downlink channel used to transmit the message is greater than or equal to a numerology of an uplink channel associated with the transmit power level.

In a twenty-seventh aspect, alone or in combination with one or more of the first aspect through the twenty-sixth aspect, the message indicates a PLRS update for multiple component carriers (CCs). The application time interval is associated with the multiple CCs.

In a twenty-eighth aspect, alone or in combination with one or more of the first aspect through the twenty-seventh aspect, the message indicates a PLRS update for multiple component carriers (CCs). The application time interval is associated with fewer than all of the CCs.

In a twenty-ninth aspect, alone or in combination with one or more of the first aspect through the twenty-eighth aspect, the message includes an indication that the designation of the signal as the PLRS is to apply to multiple component carriers (CCs). The application time interval corresponds to a common application time interval that is associated with the multiple CCs.

In a thirtieth aspect, in combination with the twenty-ninth aspect, the common application time interval begins at an end of a final slot associated with a transmission including the message or at an end of a final slot associated with an acknowledgement of the message transmitted by the UE.

In a thirty-first aspect, in combination with one or more of the twenty-ninth aspect through the thirtieth aspect, the common application time is associated with a numerology of a downlink channel associated with the message or a numerology in one of the multiple CCs of an uplink channel associated with the transmit power level.

In a thirty-second aspect, in combination with one or more of the twenty-ninth aspect through the thirty-first aspect, the message indicates a single bandwidth part (BWP) and component carrier (CC), the CC is included in a radio resource control (RRC) configured list of CCs stored by the UE. The UE receives the signal as the PLRS for each CC indicated by the list of CCs.

In a thirty-third aspect, alone or in combination with one or more of the first aspect through the thirty-second aspect, the application time interval corresponds to a number of milliseconds, slots, or symbols that begins at an end of a final slot associated with a transmission including the message or at an end of the transmission including the message.

In a thirty-fourth aspect, alone or in combination with one or more of the first aspect through the thirty-fourth aspect, the application time interval corresponds to a number of milliseconds, slots, or symbols that begins at an end of a final slot associated with associated with an acknowledgement of the message transmitted by the UE or at an end of the acknowledgement.

In a thirty-fifth aspect, in combination with the thirty-third aspect, the message corresponds to a downlink control information (DCI) message scheduling a downlink transmission. The acknowledgement is associated with the downlink transmission.

In a thirty-sixth aspect, in combination with one or more of the thirty-fourth aspect through the thirty-fifth aspect, the message corresponds to a downlink control information (DCI) message scheduling an uplink transmission. The acknowledgement is included in the uplink transmission.

In a thirty-seventh aspect, in combination with one or more of the thirty-fourth aspect through the thirty-sixth aspect, the message does not schedule an uplink or downlink transmission. The acknowledgement corresponds to a dedicated bit that is included in a physical uplink control channel (PUCCH) transmission or in a physical uplink shared channel (PUSCH) transmission.

In a thirty-eighth aspect, alone or in combination with one or more of the first aspect through the thirty-seventh aspect, the apparatus is configured to transmit an indication of a capability of the UE to a base station. The application time interval is associated with the capability of the UE.

In a thirty-ninth aspect, alone or in combination with one or more of the first aspect through the thirty-eighth aspect, the apparatus is configured to transmit an indication of a capability of the UE to a base station.

In a fortieth aspect, in combination with the thirty-ninth aspect, based on the capability of the UE, receiving from the base station an indication of the application time interval. The application time interval is selected by the base station to satisfy the capability of the UE.

In a forty-first aspect, alone or in combination with one or more of the first aspect through the fortieth aspect, the apparatus is configured to transmit an indication of a capability of the UE to a base station.

In a forty-second aspect, in combination with the forty-first aspect, based on the capability of the UE, the apparatus is configured to receive from the base station an indication of the application time interval. The application time interval is selected by the base station based on one or more selection criteria while satisfying the capability of the UE.

In a forty-third aspect, alone or in combination with one or more of the first aspect through the forty-second aspect, the message indicates that the signal is to serve as a PLRS for each of multiple channels or reference signals each associated with multiple respective application times.

In a forty-fourth aspect, alone or in combination with one or more of the first aspect through the forty-third aspect, the message indicates a common beam transmission configuration indicator (TCI) state to be applied to multiple channels or reference signals associated with multiple respective application times. The apparatus is further configured to select the application time from among the multiple respective application times.

In a forty-fifth aspect, in combination with the forty-fourth aspect, a largest application time is selected from among the multiple respective application times as the application time.

In a forty-sixth aspect, in combination with one or more of the forty-fourth aspect through the forty-fifth aspect, a largest application time is selected from among the multiple respective application times as the application time by a base station and is indicated by the base station to the UE.

In a forty-seventh aspect, in combination with one or more of the forty-fourth aspect through the forty-sixth aspect, a largest application time is selected from among the multiple respective application times as the application time associated with one or more selection criteria.

In some other aspects, a method for wireless communication at a user equipment (UE) includes receiving a message indicating a modification of one or more parameters associated with an uplink power setting of the UE. The apparatus is further configured to, the modification of the one or more parameters is to take effect upon expiration of an application time interval; after the expiration of the application time interval, applying the modified one or more parameters; and selecting the uplink power setting based on the modified one or more parameters. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In some other aspects, an apparatus includes a memory and one or more processors coupled to the memory and configured to perform the method of any of the first through forty-seventh aspects.

In some other aspects, an apparatus includes a memory and one or more processors coupled to the memory and configured to receive a message indicating a designation of a signal as a path loss reference signal (PLRS). The designation of the signal as the PLRS is associated with an application time interval. The apparatus is further configured to select, after expiration of the application time interval, a transmit power level, and the transmit power level is associated with the signal. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In some other aspects, a non-transitory computer-readable medium storing instructions executable by a processor to perform operations including receiving a message indicating a designation of a signal as a path loss reference signal (PLRS). The designation of the signal as the PLRS is associated with an application time interval. The operations further include, after expiration of the application time interval, selecting a transmit power level. The transmit power level is associated with the signal. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In some aspects, an apparatus includes means for receiving a message indicating a designation of a signal as a path loss reference signal (PLRS). The designation of the signal as the PLRS is associated with an application time interval. The apparatus further includes means for selecting, after expiration of the application time interval, a transmit power level. The transmit power level is associated with the signal. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In some aspects, a method for wireless communication at a base station includes transmitting a message to a user equipment (UE) indicating a designation of a signal as a path loss reference signal (PLRS). The designation of the signal as the PLRS is associated with an application time interval. The method further includes, after expiration of the application time interval, receiving an uplink signal from the UE having a transmit power level that is associated with the signal. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a forty-eighth aspect, the message indicates a change of the PLRS from another signal to the signal. The other signal corresponds to one of a synchronization signal block (SSB) or a channel state information reference signal (CSI-RS), and the signal corresponds to the other of the SSB or the CSI-RS.

In a forty-ninth aspect, alone or in combination with the forty-eighth aspect, the message corresponds to a downlink control information (DCI) message, a medium access control (MAC) control element (MAC-CE), or a radio resource control (RRC) configuration message.

In a fiftieth aspect, alone or in combination with one or more of the forty-eighth aspect through the forty-ninth aspect, the PLRS is associated with at least one of a first channel, a first reference signal, or a first transmission configuration indicator (TCI) state.

In a fifty-first aspect, in combination with the fiftieth aspect, the application time interval is associated with whether the UE has previously tracked the signal for a second channel, as a second reference signal, for a second TCI state, or a combination thereof.

In a fifty-second aspect, in combination with one or more of the fiftieth aspect through the fifty-first aspect, the UE has previously tracked the signal as the second reference signal. The UE updates a TCI state association from a first PLRS identifier (ID) to a second PLRS identifier.

In a fifty-third aspect, alone or in combination with one or more of the forty-eighth aspect through the fifty-second aspect, the UE receives the signal according to a periodicity. The application time interval is associated with the periodicity.

In a fifty-fourth aspect, alone or in combination with one or more of the forty-eighth aspect through the fifty-third aspect, the application time interval is associated with at least one of a target channel associated with the PLRS or a signal type associated with the signal.

In a fifty-fifth aspect, in combination with the fifty-fourth aspect, the channel corresponds to a physical uplink control channel (PUCCH), a codebook-based physical uplink shared channel (PUSCH), or a non-codebook-based PUSCH.

In a fifty-sixth aspect, in combination with one or more of the fifty-fourth aspect through the fifty-fifth aspect, the signal type corresponds to a persistently (P) scheduled type, a semi-persistently scheduled (SPS) type, or an a-periodically (AP) scheduled type.

In a fifty-seventh aspect, alone or in combination with one or more of the forty-eighth aspect through the fifty-sixth aspect, the application time interval is associated with a type of transmission configuration indicator (TCI) state associated with the PLRS.

In a fifty-eighth aspect, in combination with the fifty-seventh aspect, the type of TCI state corresponds to one of a joint downlink (DL) and uplink (UL) common TCI state that is associated with a common beam for at least one DL channel and for at least one UL channel, a separate UL common TCI state associated with a common beam for multiple UL channels, a single UL channel TCI state associated with a beam for a single UL channel, or an UL spatial relation info type that is associated with multiple component carriers (CCs).

In a fifty-ninth aspect, alone or in combination with one or more of the forty-eighth aspect through the fifty-eighth aspect, the application time interval is associated with whether a common antenna panel of the UE is used to receive the message and the signal or separate antenna panels of the UE are used to receive the message and the signal.

In a sixtieth aspect, alone or in combination with one or more of the forty-eighth aspect through the fifty-ninth aspect, the application time interval is associated with whether a common antenna panel of the UE is used to transmit an acknowledgement (ACK) of the message and the signal or separate antenna panels of the UE are used to transmit the ACK and the signal.

In a sixty-first aspect, alone or in combination with one or more of the forty-eighth aspect through the sixtieth aspect, the application time interval is associated with a source type associated with the signal.

In a sixty-second aspect, in combination with the sixty-first aspect, the source type indicates that the base station transmitting is one of a serving cell of the UE or a non-serving cell of the UE.

In a sixty-third aspect, in combination with one or more of the sixty-first aspect through the sixty-second aspect, the source type indicates that a transmission configuration indicator (TCI) state associated with the PLRS is associated with a serving cell of the UE or with a non-serving cell of the UE.

In a sixty-fourth aspect, alone or in combination with one or more of the forty-eighth aspect through the sixty-third aspect, the application time interval is associated with at least one of whether the signal is tracked for one component carrier (CC) or for multiple CCs, a number of CCs associated with the signal, or a number of CCs used by the UE for downlink control information (DCI) monitoring.

In a sixty-fifth aspect, alone or in combination with one or more of the forty-eighth aspect through the sixty-fourth aspect, the application time interval corresponds to a number or symbols or to a number of slots that is associated with a numerology associated with a downlink channel used to transmit the message.

In a sixty-sixth aspect, alone or in combination with one or more of the forty-eighth aspect through the sixty-fifth aspect, the transmit power level is associated with an uplink channel. The application time interval corresponds to a number or symbols or to a number of slots that is based on a numerology associated with the uplink channel.

In a sixty-seventh aspect, alone or in combination with one or more of the forty-eighth aspect through the sixty-sixth aspect, the transmit power level is associated with an uplink channel. The application time interval corresponds to a number or symbols or to a number of slots that is based on a numerology associated with the uplink channel and that is further based on a numerology associated with a downlink channel used to transmit the message.

In a sixty-eighth aspect, alone or in combination with one or more of the forty-eighth aspect through the sixty-seventh aspect, the application time interval is associated with a sum of a first number of symbols or slots and a second number of symbols or slots. The first number corresponds to a value that is associated with at least one of a capability of the UE, a configuration of the base station, a value specified by a wireless communication protocol, or a periodicity of the signal.

In a sixty-ninth aspect, in combination with the sixty-eighth aspect, the second number is selected to match a duration of symbols or slots in terms of a numerology associated with a downlink channel used to transmit the message if the numerology associated with a downlink channel used to transmit the message being less than a numerology of an uplink channel associated with the transmit power level.

In a seventieth aspect, in combination with one or more of the sixty-eighth aspect through the sixty-ninth aspect, the second number corresponds to zero if a numerology associated with a downlink channel used to transmit the message is greater than or equal to a numerology of an uplink channel associated with the transmit power level.

In a seventy-first aspect, alone or in combination with one or more of the forty-eighth aspect through the seventieth aspect, the message indicates a PLRS update for multiple component carriers (CCs). The application time interval is associated with the multiple CCs.

In a seventy-second aspect, alone or in combination with one or more of the forty-eighth aspect through the seventy-first aspect, the message indicates a PLRS update for multiple component carriers (CCs), and the application time interval is associated with fewer than all of the CCs.

In a seventy-third aspect, alone or in combination with one or more of the forty-eighth aspect through the seventy-second aspect, the message includes an indication that the designation of the signal as the PLRS is to apply to multiple component carriers (CCs). The application time interval corresponds to a common application time interval that is associated with the multiple CCs.

In a seventy-fourth aspect, in combination with the seventy-third aspect, the common application time interval begins at an end of a final slot associated with a transmission including the message or at an end of a final slot associated with an acknowledgement of the message transmitted by the UE.

In a seventy-fifth aspect, in combination with one or more of the seventy-third aspect through the seventy-fourth aspect, the common application time is associated with a numerology of a downlink channel associated with the message or a numerology in one of the multiple CCs of an uplink channel associated with the transmit power level.

In a seventy-sixth aspect, in combination with one or more of the seventy-third aspect through the seventy-fifth aspect, the message indicates a single bandwidth part (BWP) and component carrier (CC). The CC is included in a radio resource control (RRC) configured list of CCs stored by the UE. The UE receives the signal as the PLRS for each CC indicated by the list of CCs.

In a seventy-seventh aspect, in combination with one or more of the forty-eighth aspect through the seventy-sixth aspect, the application time interval corresponds to a number of milliseconds, slots, or symbols that begins at an end of a final slot associated with a transmission including the message or at an end of the transmission including the message.

In a seventy-eighth aspect, alone or in combination with one or more of the forty-eighth aspect through the seventy-seventh aspect, the application time interval corresponds to a number of milliseconds, slots, or symbols that begins at an end of a final slot associated with associated with an acknowledgement of the message transmitted by the UE or at an end of the acknowledgement.

In a seventy-ninth aspect, in combination with the seventy-eighth aspect, the message corresponds to a downlink control information (DCI) message scheduling a downlink transmission. The acknowledgement is associated with the downlink transmission.

In a eightieth aspect, in combination with one or more of the seventy-eighth aspect through the seventy-ninth aspect, the message corresponds to a downlink control information (DCI) message scheduling an uplink transmission. The acknowledgement is included in the uplink transmission.

In a eighty-first aspect, in combination with one or more of the seventy-eighth aspect through the eightieth aspect, the message does not schedule an uplink or downlink transmission. The acknowledgement corresponds to a dedicated bit that is included in a physical uplink control channel (PUCCH) transmission or in a physical uplink shared channel (PUSCH) transmission.

In a eighty-second aspect, alone or in combination with one or more of the forty-eighth aspect through the eighty-first aspect, the apparatus is configured to receive an indication of a capability of the UE. The application time interval is associated with the capability of the UE.

In a eighty-third aspect, alone or in combination with one or more of the forty-eighth aspect through the eighty-second aspect, the apparatus is configured to receive an indication of a capability of the UE.

In a eighty-fourth aspect, in combination with the eighty-third aspect, the apparatus is configured to, based on the capability of the UE, transmit to the UE an indication of the application time interval. The application time interval is selected by the base station to satisfy the capability of the UE.

In a eighty-fifth aspect, alone or in combination with one or more of the forty-eighth aspect through the eighty-fourth aspect, the apparatus is configured to receive an indication of a capability of the UE.

In a eighty-sixth aspect, in combination with the eighty-fifth aspect, the apparatus is configured to, based on the capability of the UE, transmit to the UE an indication of the application time interval. The application time interval is selected by the base station based on one or more selection criteria while satisfying the capability of the UE.

In a eighty-seventh aspect, alone or in combination with one or more of the forty-eighth aspect through the eighty-sixth aspect, the message indicates that the signal is to serve as a PLRS for each of multiple channels or reference signals each associated with multiple respective application times.

In a eighty-eighth aspect, alone or in combination with one or more of the forty-eighth aspect through the eighty-seventh aspect, the message indicates a common beam transmission configuration indicator (TCI) state to be applied to multiple channels or reference signals associated with multiple respective application times.

In a eighty-ninth aspect, in combination with the eighty-eighth aspect, the apparatus is configured to select the application time from among the multiple respective application times.

In a ninetieth aspect, in combination with one or more of the eighty-eighth aspect through the eighty-ninth aspect, a largest application time is selected from among the multiple respective application times as the application time.

In a ninety-first aspect, in combination with one or more of the eighty-eighth aspect through the ninetieth aspect, a largest application time is selected from among the multiple respective application times as the application time by the base station and is indicated by the base station to the UE.

In a ninety-second aspect, in combination with one or more of the eighty-eighth aspect through the ninety-first aspect, a largest application time is selected from among the multiple respective application times as the application time associated with one or more selection criteria.

In some aspects, a method for wireless communication at a base station includes transmitting a message to a user equipment (UE) indicating a modification of one or more parameters associated with an uplink power setting of the UE. The modification of the one or more parameters is to take effect upon expiration of an application time interval. The method further includes, after the expiration of the application time interval, receiving and uplink signal from the UE having the uplink power setting. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In some aspects, an apparatus includes a memory and one or more processors coupled to the memory and configured to perform the method of any of the first through ninety-second aspects. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In some aspects, an apparatus includes a memory and one or more processors coupled to the memory and configured to transmit a message to a user equipment (UE) indicating a designation of a signal as a path loss reference signal (PLRS). The designation of the signal as the PLRS is associated with an application time interval. The apparatus is further configured to receive, after expiration of the application time interval, an uplink signal from the UE having a transmit power level that is associated with the signal. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In some aspects, a non-transitory computer-readable medium stores instructions executable by a processor to perform operations including transmitting a message to a user equipment (UE) indicating a designation of a signal as a path loss reference signal (PLRS). The designation of the signal as the PLRS is associated with an application time interval. The operations further include, after expiration of the application time interval, receiving an uplink signal from the UE having a transmit power level that is associated with the signal. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In some aspects, an apparatus includes means for transmitting a message to a user equipment (UE) indicating a designation of a signal as a path loss reference signal (PLRS). The designation of the signal as the PLRS is associated with an application time interval. The apparatus further includes means for receiving, after expiration of the application time interval, an uplink signal from the UE having a transmit power level that is associated with the signal. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, etc., or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and operations described herein may be implemented as electronic hardware, computer software, or combinations of both. To illustrate, various illustrative components, blocks, modules, circuits, and operations have been described above generally in terms of their functionality. Whether such functionality is implemented as hardware or software depends upon the particular application and design of the overall system. Skilled artisans may implement the described functionality in varying ways for each particular application, but such implementation decisions should not be interpreted as causing a departure from the scope of the disclosure. Skilled artisans will also readily recognize that the order or combination of components, methods, or interactions described herein are merely examples and that the components, methods, or interactions of the various aspects of the disclosure may be combined or performed in ways other than those illustrated and described herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The operations of a method or process described herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus configured for wireless communication, comprising:
   at least one processor; and
   a memory coupled to the at least one processor, wherein the at least one processor is configured to:
      receive a message indicating a designation of a signal as a path loss reference signal (PLRS), wherein the designation of the signal as the PLRS is associated with an application time interval; and
      after expiration of the application time interval, select a transmit power level associated with a user equipment (UE), wherein the transmit power level is associated with the signal.

2. The apparatus of claim 1, wherein the application time interval is associated with whether a common antenna panel of the UE is used to receive the message and the signal or separate antenna panels of the UE are used to receive the message and the signal.

3. The apparatus of claim 1, wherein the application time interval is associated with whether a common antenna panel of the UE is used to transmit an acknowledgement (ACK) of the message and the signal or separate antenna panels of the UE are used to transmit the ACK and the signal.

4. The apparatus of claim 1, wherein the application time interval is associated with at least one of whether the signal is tracked for one component carrier (CC) or for multiple CCs, a number of CCs associated with the signal, or a number of CCs used by the UE for downlink control information (DCI) monitoring.

5. The apparatus of claim 1, wherein the application time interval corresponds to a number or symbols or to a number of slots that is associated with a numerology associated with a downlink channel used to transmit the message.

6. The apparatus of claim 1, wherein the transmit power level is associated with an uplink channel, and wherein the application time interval corresponds to a number or symbols or to a number of slots that is based on a numerology associated with the uplink channel.

7. The apparatus of claim 1, wherein the transmit power level is associated with an uplink channel, and wherein the application time interval corresponds to a number or symbols or to a number of slots that is based on a numerology associated with the uplink channel and that is further based on a numerology associated with a downlink channel used to transmit the message.

8. The apparatus of claim 1, wherein the application time interval corresponds to a number of milliseconds, slots, or symbols that begins at an end of a final slot associated with a transmission including the message or at an end of the transmission including the message.

9. The apparatus of claim 1, wherein the at least one processor is further configured to transmit an indication of a capability of the UE to a base station, wherein the application time interval is associated with the capability of the UE.

10. A method for wireless communication at a user equipment (UE), comprising:
receiving a message indicating a designation of a signal as a path loss reference signal (PLRS), wherein the designation of the signal as the PLRS is associated with an application time interval; and
after expiration of the application time interval, selecting a transmit power level associated with the UE, wherein the transmit power level is associated with the signal.

11. The method of claim 10, further comprising:
performing one or more measurements based on the signal; and
selecting a path loss parameter based on the one or more measurements, wherein the transmit power level is based on the path loss parameter.

12. The method of claim 11, wherein at least one measurement of the one or more measurements is performed after receiving the message and prior to the expiration of the application time interval.

13. The method of claim 10, wherein the message indicates a change of the PLRS from another signal to the signal, wherein the other signal corresponds to one of a synchronization signal block (SSB) or a channel state information reference signal (CSI-RS), and wherein the signal corresponds to the other of the SSB or the CSI-RS.

14. The method of claim 10, wherein the message corresponds to a downlink control information (DCI) message, a medium access control (MAC) control element (MAC-CE), or a radio resource control (RRC) configuration message.

15. The method of claim 10, wherein:
the PLRS is associated with at least one of a first channel, a first reference signal, or a first transmission configuration indicator (TCI) state; and
the application time interval is associated with whether the UE has previously tracked the signal for a second channel, as a second reference signal, for a second TCI state, or a combination thereof.

16. An apparatus configured for wireless communication, comprising:
at least one processor; and
a memory coupled to the at least one processor, wherein the at least one processor is configured to:
transmit a message to a user equipment (UE) indicating a designation of a signal as a path loss reference signal (PLRS), wherein the designation of the signal as the PLRS is associated with an application time interval; and
receive, after expiration of the application time interval, an uplink signal from the UE having a transmit power level that is associated with the signal.

17. The apparatus of claim 16, wherein the application time interval is associated with at least one of whether the signal is tracked for one component carrier (CC) or for multiple CCs, a number of CCs associated with the signal, or a number of CCs used by the UE for downlink control information (DCI) monitoring.

18. The apparatus of claim 16, wherein the application time interval corresponds to a number or symbols or to a number of slots that is associated with a numerology associated with a downlink channel used to transmit the message.

19. The apparatus of claim 16, wherein the transmit power level is associated with an uplink channel, and wherein the application time interval corresponds to a number or symbols or to a number of slots that is based on a numerology associated with the uplink channel.

20. The apparatus of claim 16, wherein the transmit power level is associated with an uplink channel, and wherein the application time interval corresponds to a number or symbols or to a number of slots that is based on a numerology associated with the uplink channel and that is further based on a numerology associated with a downlink channel used to transmit the message.

21. The apparatus of claim 16, wherein the application time interval is associated with whether a common antenna panel of the UE is used to receive the message and the signal or separate antenna panels of the UE are used to receive the message and the signal.

22. The apparatus of claim 16, wherein the application time interval is associated with whether a common antenna panel of the UE is used to transmit an acknowledgement (ACK) of the message and the signal or separate antenna panels of the UE are used to transmit the ACK and the signal.

23. A method for wireless communication at a base station, comprising:
transmitting a message to a user equipment (UE) indicating a designation of a signal as a path loss reference signal (PLRS), wherein the designation of the signal as the PLRS is associated with an application time interval; and
after expiration of the application time interval, receiving an uplink signal from the UE having a transmit power level that is associated with the signal.

24. The method of claim 23, wherein the message indicates a change of the PLRS from another signal to the signal, wherein the other signal corresponds to one of a synchronization signal block (SSB) or a channel state information reference signal (CSI-RS), and wherein the signal corresponds to the other of the SSB or the CSI-RS.

25. The method of claim 23, wherein the message corresponds to a downlink control information (DCI) message, a medium access control (MAC) control element (MAC-CE), or a radio resource control (RRC) configuration message.

26. The method of claim 23, wherein:
the PLRS is associated with at least one of a first channel, a first reference signal, or a first transmission configuration indicator (TCI) state; and
the application time interval is associated with whether the UE has previously tracked the signal for a second channel, as a second reference signal, for a second TCI state, or a combination thereof.

27. The method of claim 23, wherein the application time interval is associated with whether a common antenna panel of the UE is used to receive the message and the signal or separate antenna panels of the UE are used to receive the message and the signal.

28. The method of claim 23, wherein the application time interval is associated with whether a common antenna panel of the UE is used to transmit an acknowledgement (ACK) of the message and the signal or separate antenna panels of the UE are used to transmit the ACK and the signal.

* * * * *